(12) United States Patent
Jiang et al.

(10) Patent No.: US 11,462,060 B2
(45) Date of Patent: Oct. 4, 2022

(54) DATA COLLECTION AUTOMATION SYSTEM

(71) Applicant: Baidu USA LLC, Sunnyvale, CA (US)

(72) Inventors: Shu Jiang, Sunnyvale, CA (US); Qi Luo, Sunnyvale, CA (US); Jinghao Miao, Sunnyvale, CA (US); Jiangtao Hu, Sunnyvale, CA (US); Weiman Lin, Sunnyvale, CA (US); Jiaxuan Xu, Sunnyvale, CA (US); Yu Wang, Sunnyvale, CA (US); Jinyun Zhou, Sunnyvale, CA (US); Runxin He, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 701 days.

(21) Appl. No.: 16/397,633

(22) Filed: Apr. 29, 2019

(65) Prior Publication Data

US 2020/0342693 A1 Oct. 29, 2020

(51) Int. Cl.
| | | |
|---|---|---|
| G07C 5/08 | (2006.01) | |
| G06N 20/00 | (2019.01) | |
| G05D 1/00 | (2006.01) | |
| G06F 3/0483 | (2013.01) | |
| G06F 3/0482 | (2013.01) | |

(52) U.S. Cl.
CPC .......... *G07C 5/085* (2013.01); *G05D 1/0088* (2013.01); *G06N 20/00* (2019.01); *G05D 2201/0213* (2013.01); *G06F 3/0482* (2013.01); *G06F 3/0483* (2013.01)

(58) Field of Classification Search
CPC ...... G07C 5/085; G06N 20/00; G05D 1/0088; G05D 2201/0213; G06F 3/0482; G06F 3/0483
USPC .......................................................... 701/27
See application file for complete search history.

(56) References Cited

U.S. PATENT DOCUMENTS 9,805,601 B1* 10/2017 Fields ..................... B60T 17/22
2018/0253963 A1* 9/2018 Coelho de Azevedo .....................
B60R 16/0231

* cited by examiner

*Primary Examiner* — Gertrude Arthur Jeanglaude
(74) *Attorney, Agent, or Firm* — Womble Bond Dickinson (US) LLP

(57) ABSTRACT

An autonomous driving vehicle (ADV) receives instructions for a human test driver to drive the ADV in manual mode and to collect a specified amount of driving data for one or more specified driving categories. As the user drivers the ADV in manual mode, driving data corresponding to the one or more driving categories is logged. A user interface of the ADV displays the one or more driving categories that the human driver is instructed collect data upon, and a progress indicator for each of these categories as the human driving progresses. The driving data is uploaded to a server for machine learning. If the server machine learning achieves a threshold grading amount of the uploaded data to variables of a dynamic self-driving model, then the server generates an ADV self-driving model, and distributes the model to one or more ADVs that are navigated in the self-driving mode.

21 Claims, 9 Drawing Sheets

DATA COLLECTION AUTOMATION SYSTEM

TECHNICAL FIELD

Embodiments of the present disclosure relate generally to operating autonomous vehicles. More particularly, embodiments of the disclosure relate to a more efficient manner of collecting training data for autonomous driving models of an autonomous driving vehicle.

BACKGROUND

Vehicles operating in an autonomous mode (e.g., driverless, or "self-driving" cars) can relieve occupants, especially the driver, from some driving-related responsibilities. When operating in an autonomous mode, the vehicle can navigate to various locations using onboard sensors, allowing the vehicle to travel with minimal human interaction or in some cases without a driver or passengers.

To operate an autonomous driving vehicle (ADV) in autonomous driving mode, a substantial amount of training data must be collected to train autonomous driving model(s) to safely operate the ADV in a driverless mode. Data is collected while a human driver is operating the ADV in manual ("human driver") mode. Data collection is crucial for generating, and thoroughly training, dynamic models and calibration tables for an autonomous driving vehicle. Collecting a data set that covers all necessary scenarios demands professional knowledge of machine learning and ADV control systems. A human driver does not know what data needs to be collected. Thus, an engineer typically accompanies the human driver to guide the human driver on the data that needs to be collected for training and/or calibrating an autonomous driving vehicle operation model. Such an approach is very inefficient.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
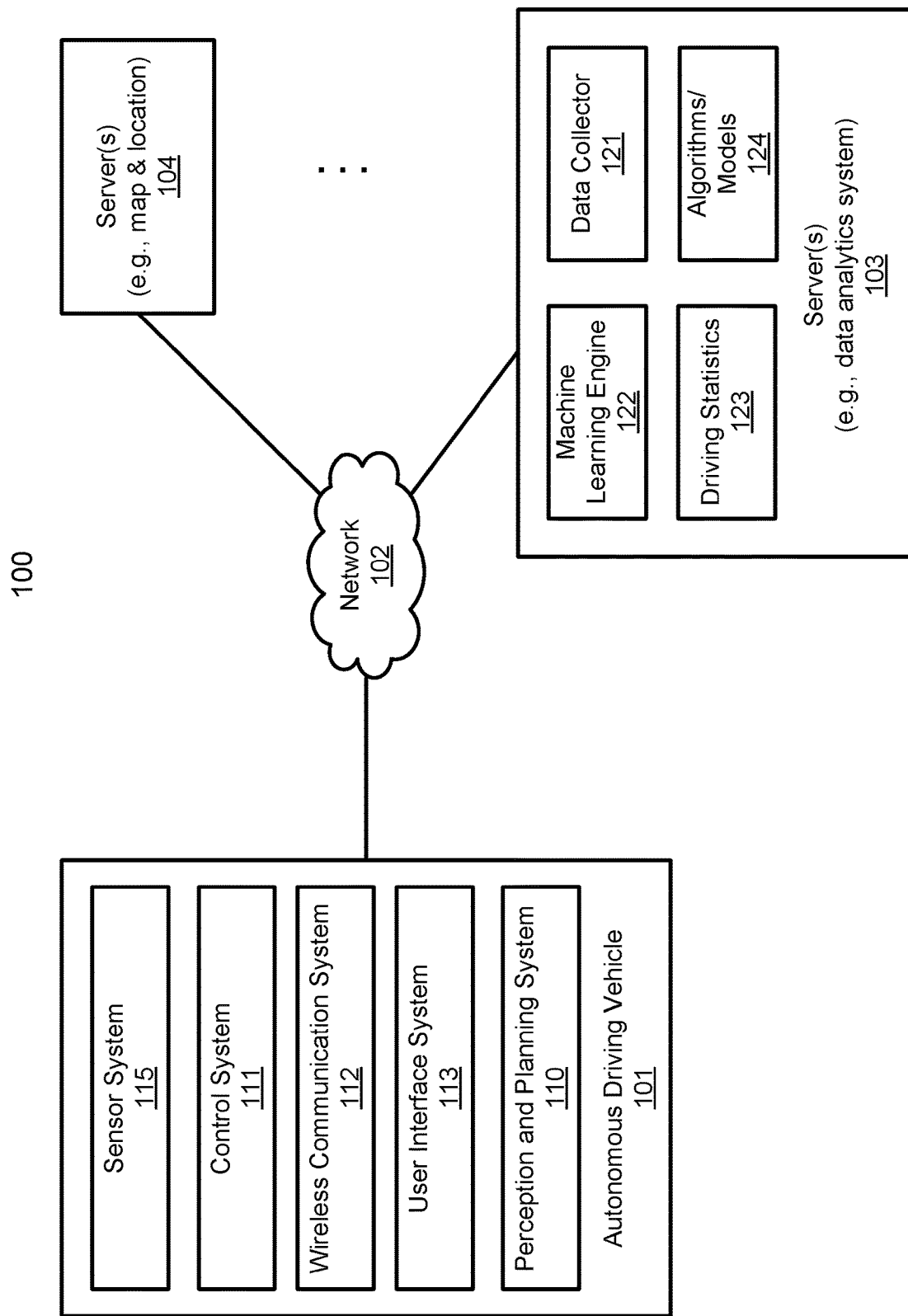
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In a first aspect, a computer-implemented method is practiced on a computing system in an autonomous driving vehicle (ADV) operated by a human driver in manual driving mode. The method includes receiving instructions to collect driving data for one or more driving categories, and, for each driving category, an amount of data to collect. The one or more driving categories are presented on a user interface of the ADV. In an embodiment, the driving categories are defined by the server that will use the collected data to generate an autonomous mode (self-driving) model for navigating the ADV in self-driving mode. In an embodiment, the instructions to collect driving data for one or more driving categories of driving are received from the server. In an embodiment, the amount of data to be collected is specified as a number of seconds of data frames, or a number of data frames. In response to determining that the ADV is being driven in human driver mode in accordance with one of the one or more driving categories, the method further includes presenting, via the user interface, an indication of the driving category in which the ADV is being driven, logging ADV driving data for the driving category, and updating a progress indicator of the user interface that indicates progress on the amount of data collected for the driving category.

Presenting, via the user interface, the indication of the driving category in which the ADV is being driven can include a graphical indicator of the driving category on the user interface or an audio indicator of the driving category. A graphical indication of the driving category can include displaying the driving category in an unused area of a display screen of the user interface, or visually highlighting the driving category in a manner different from other driving categories displayed on the user interface. The method additionally includes transmitting the data collected, from the ADV to a server, for the one or more driving categories, to a server to train a driving model for the ADV. The method further includes receiving the trained driving model from the server and navigating the ADV in self-driving mode in accordance with the trained driving model received from the server. In an embodiment, the driving data logged for the driving category includes a label identifying the driving category, and at least a speed of the ADV, an amount and direction of a steering input to a steering control of the ADV, and an amount of a brake input to a braking control of the ADV. In an embodiment, updating the progress indicator for the driving category reflects the progress on the driving category made by this ADV, or indicates the progress on the driving category by a plurality of ADVs received from the server.

In a second aspect, a server is communicatively coupled to one or more autonomous driving vehicles (ADVs). The server includes a processor and a memory coupled to the processor to store instructions, which when executed by the processor, cause the processor to receive driving data of one or more ADVs driven by a human driver in one or more driving categories, for one or more types of ADVs. The instructions further cause the processor to select driving data for a specified type of ADV for one or more categories of driving. The server performs machine learning to a predetermined grading threshold on the selected driving data to grade the driving data to a predetermined set of features or variables of a calibration table or dynamic data model for the ADV. The server then generates one or more calibration tables and at least one ADV self-driving model for the specified ADV type. The server distributes the one or more calibration tables and at least one ADV self-driving model for the specified ADV type to at least one ADV of the specified type, to navigate the at least one ADV in self-driving mode.

In response to the server determining that the machine learning performed with the selected driving data does not achieve a predetermined threshold grading amount, then, prior to generating the one or more calibration tables and at least one ADV self-driving model for the specification ADV type, the server transmits instructions to one or more ADVs of the specified ADV type to collect additional data. The server receives the collected additional data from one or more ADVs of the specified ADV type in accordance with the instructions and re-performs the selecting of the driving data for the specified type of ADV for one or more categories of driving, and re-performs the machine learning to the predetermined grading threshold value on the selected driving data. The server may repeat the process of instructing the ADVs to collect more data, and the server re-performing the selecting of the driving data and machine learning, until the grading threshold amount is achieved.

In a third aspect, any of the above methods can be performing by a processing system having at least one hardware processor, and a memory programmed with executable instructions that, when executed by the processing system, perform the operations of the methods. In a fourth aspect, any of the above methods can be implemented with executable instructions programmed onto a non-transitory computer readable medium, such as a memory or storage. When the executable instructions are executed by a processing system having at least one hardware processor, the processing system causes the method operations to be performed.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, throttle signal or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
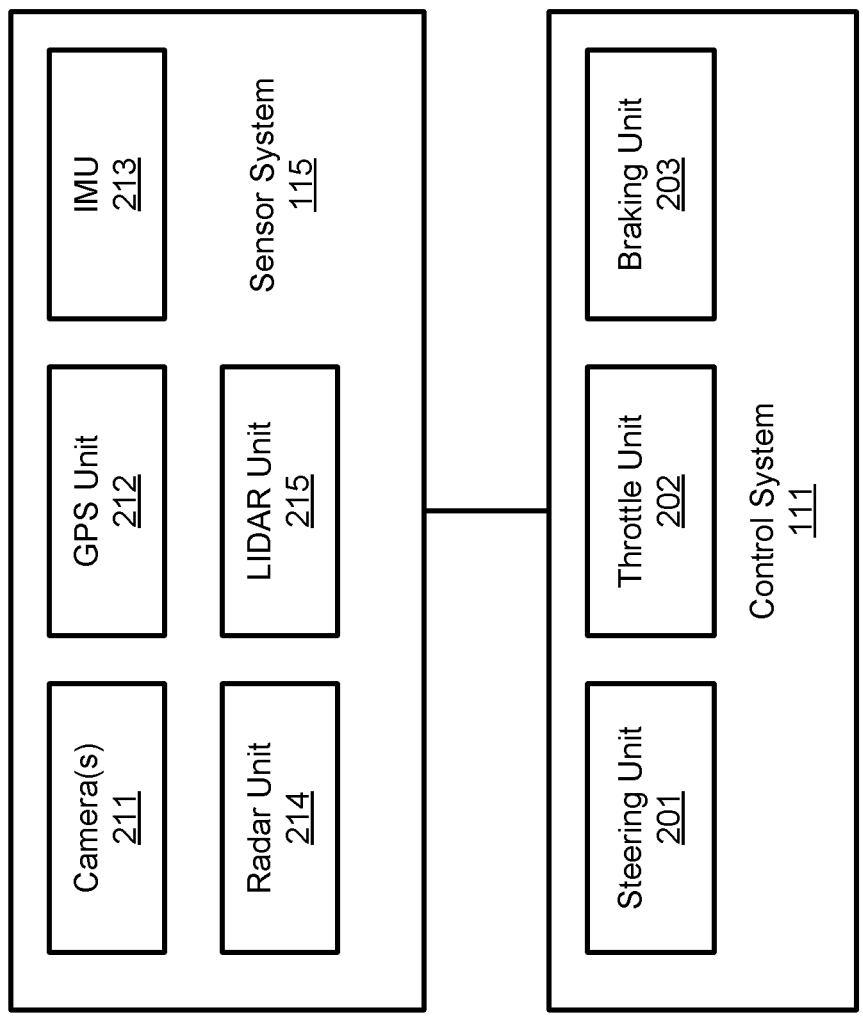
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include training of a specified model of ADV using human driving data that is pre-categorized for machine learning by server 103 machine learning engine 122. A plurality of autonomous driving vehicles (ADVs) 101 can receive instructions to a human driver of the ADV to collect a specified amount of driving data in accordance with one or more pre-defined driving categories. A user interface within the ADV 101 informs the human driving of the specified driving categories that the human driver is to collect data upon. Each displayed driving category has a progress indicator that lets the driver know the progress on the data collection for the driving category. Visual and/or audible indicators let the driver know that he/she is currently driving the ADV in manual mode in accordance with one of the specified driving categories and is collecting data for that driving category. The ADV 101 can upload its data to the server 103 for machine learning engine 122 to process. Machine learning engine 122 can grade the machine learning using the received driving data for one or more categories to variables a calibration table or dynamic driving model to a predetermined grading threshold value. Algorithms/models 124 of server 103 can further generate an ADV self-driving dynamic model for the ADV and distribute the dynamic model to one or more ADVs. Algorithms/models 124 can then be uploaded on ADVs to be utilized during autonomous driving in real-time.

Figure 3:
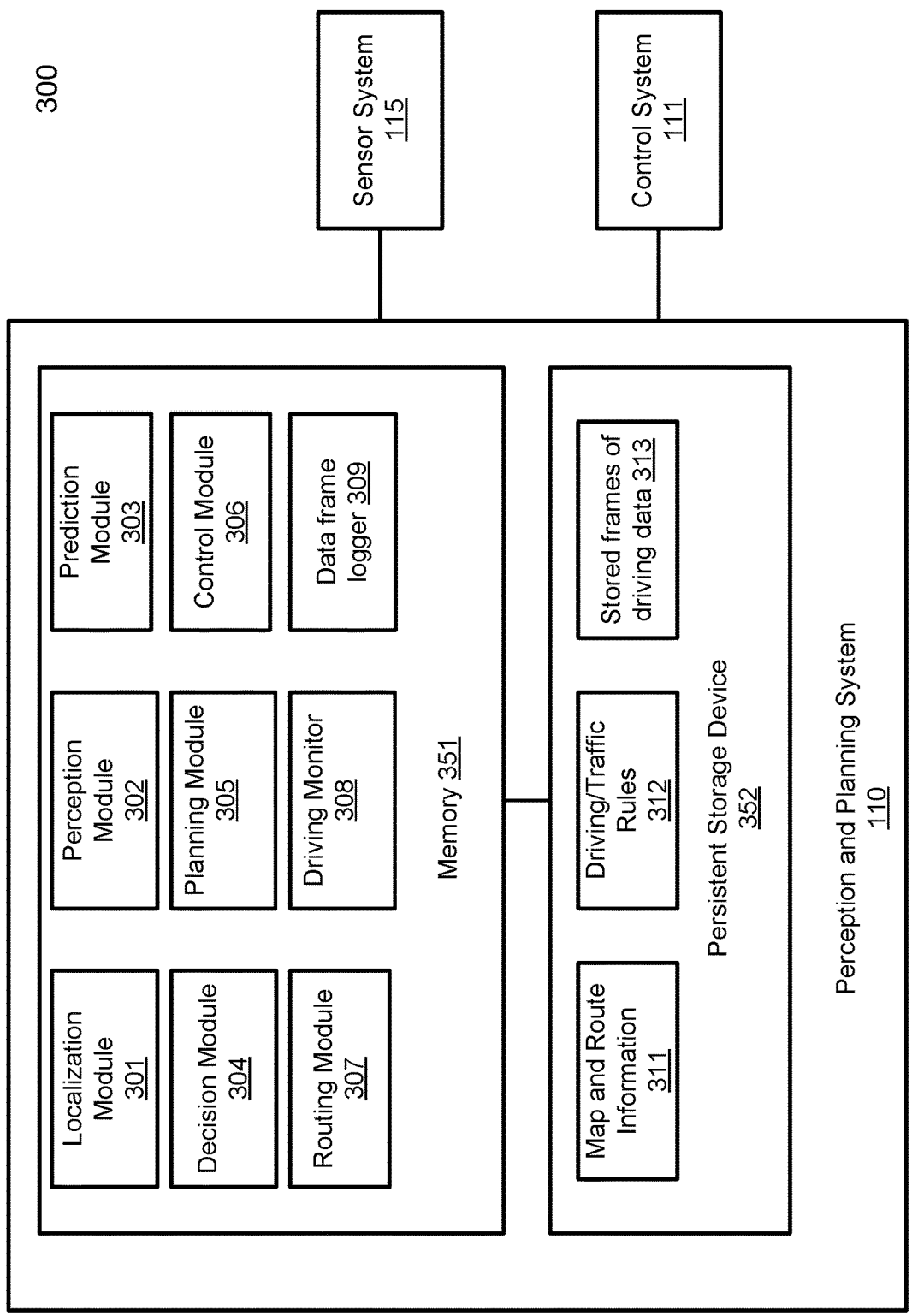
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, driving monitor 308, and data frame logger 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Each of the modules 301-307 may generate one or more messages of ADV driving information related to the module at regular and/or irregular intervals. The specific messages generated, and whether/when the messages are generated, can be determined based upon whether the ADV is being driven in manual mode ("human driver mode") or self-driving mode ("autonomous driving mode"). Driving monitor 308 can determine which of these messages is to be captured. Driving monitor 308 can receive, sequence, and package the messages into time-based data frames for storage by data frame logger 309 in time increments of, e.g., 10 ms per frame.

For example, localization module 301 may generate a message indicating a location of the ADV on a regular basis, such as every 100 ms. Perception module 302 may generate one or more messages each corresponding to a perceived obstacle on the driving path of the ADV. Prediction module 303 may generate a message that includes a predicted trajectory for each object perceived by the perception module 302 on a regular basis, such as every 100 ms. Control module 306 may generate a message indicating ADV inputs to throttle, steering and braking and, e.g., 100 ms increments. Sensor system 115 may generate one or more messages for each sensor in the sensor system to indicate, e.g., speed of the ADV, acceleration of the ADV, rate of acceleration of the ADV, lateral acceleration of the ADV, physical brake input amount ("tap," percent of braking input, or "harsh" braking input), physical steering input (number of turns of the steering wheel or a percentage of the full number of turns which the steering wheel can be turned in each direction) or throttle input, such as a percentage of throttle currently being applied. In self-driving mode, the brake, steering, and throttle messages may be received from the control module 306 as ADV outputs to the control module.

In human driving mode, the brake, steering, and throttle messages represent human inputs to the control system.

Messages from the sensor system 115 can further include a "pitch" (forward/backward) of the ADV, a yaw (right/left) of the ADV, a temperature outside the ADV, and an assessment of the weather (sun, clouds, fog, mist, light rain, rain, heavy rain, snow, ice) and other operational and environmental variables of the ADV. All of the above messages can be received, sequenced, and packaged by driving monitor 308, and passed to data frame logger 309 for storing in stored frames of driving data 313. In an embodiment, one or more frames may be labeled with a driving category indicating a macro-view of the driving state of the vehicle so that the data frames may be easily identified for off-line machine learning.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4A:
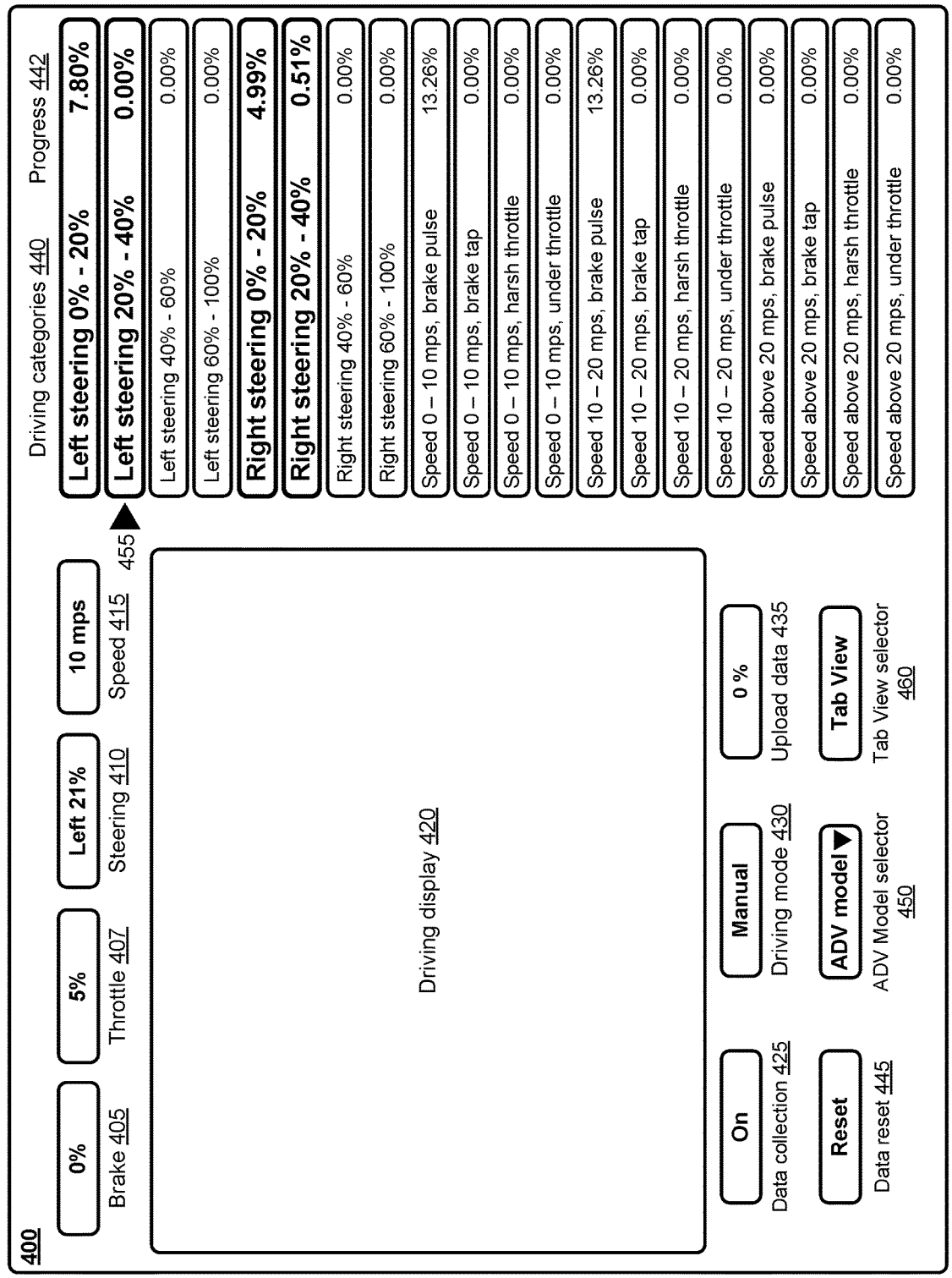
FIGS. 4A and 4B are block diagrams illustrating a user interface for a data collection automation system in an autonomous driving vehicle (ADV) according to some embodiments.

FIG. 4A is a block diagram illustrating a user interface 400 for a data collection automation system in an autonomous driving vehicle (ADV) according to an embodiment. As described above, goals of the claimed embodiments described herein include facilitating collection of human driving data in predefined driving categories, apprising the human driver of the progress of data collection in the predefined categories, to upload the collected data to a server for machine learning, and to receive a trained dynamic model for navigating the ADV in self-driving mode, in accordance with the trained model.

User interface (UI) 400 is displayed in the ADV for the human driver's use. UI 400 can include a brake input indicator 405, throttle input indicator 407, steering input indicator 410, and speed indicator 415. In human driving mode, control input indicators brake 405, throttle 407, and steering 410 represent the vehicle control inputs provided by a human driver. Brake input 405 can be expressed in a percentage (0 . . . 100%), e.g. less than 30% brake input, or a "brake pulse" which is, e.g., greater than 30%. In an embodiment, the threshold values for distinguishing between brake tap and brake pulse can be configured to be a different value than 30%. In an embodiment, additional braking categories can be configured, such as brake tap 0-20%, normal braking 20-30%, and harsh braking greater than 30% brake input. Steering input 410 can be expressed as a percentage of the total number of steering wheel revolutions to the left or right that the steering wheel is capable of being turned.

For example, if the steering wheel is capable of turning 1.5 full revolutions to the left or right, then turning the steering wheel 0.2 full revolutions would result in a percentage of 0.2*1.5=0.3 or 30% steering input. "Harsh throttle" may be expressed in terms of time and percentage, such as greater than 65% throttle input for 2 to 3 seconds duration or longer, such as when a human driver is preparing to pass a vehicle or enter a freeway. Similarly, "under throttle" can be expressed as a percentage and time such as 0-5% throttle input for 2-3 seconds, such as a human driver may do when "coasting." In an embodiment, throttle input for driving categories can have additional ranges, such as throttle 0-20% slow acceleration, 20-50% normal acceleration, and greater than 50% is harsh acceleration. The above values are exemplary only. Definitions for each driving input type for each driving category 440 can be defined by a test engineer or by a server such as server 103. In an embodiment, the UI 400 can be configured to display on the driving categories for which instructions have been received to collect driving data.

UI 400 can further include a plurality of driving categories 440 each having a progress indicator 442. Exemplary driving categories are shown under the driving categories 440 heading in FIG. 4. A human driver, or the ADV, can receive instructions to collect data for one or more of the driving categories 440. The ADV can receive the instructions from a server that will later receive the data collected. Alternatively, a human driver can receive written instructions as to which driving categories 440 to collect data upon, and how much data to collect for each category. A user can touch a driving category on the UI 400, e.g. "left steering 0%-20%" and enter a quantity of data to collect, e.g. a duration of time or a number of data frames to collect. In an embodiment, an email system within the ADV 101 can receive an email of instructions on driving data to collect, the human driver can open the email, select an activation control from the email, and the UI 400 will update to highlight the specific driving categories 440 to collect data for, and a current progress on the collection of driving data for the highlighted categories.

Progress of data collected 442 for a driving category 440 can either represent the progress of data collected by this particular ADV 101, or represent progress on a total amount of data needed to be collected by a plurality of ADVs 101. In the latter embodiment, the plurality of ADVs all contribute to the progress on collecting data for a driving category 440 and the progress indicator 442 indicates the collective progress for the plurality of ADVs. The server 103 can estimate an amount of data needed to achieve a threshold grading value for a dynamic model for use in a self-driving ADV. As the server receives data from any of the plurality of ADVs for a driving category, the server can push an update message to the plurality of ADVs indicating a current progress of data collection for the driving category, for the plurality of ADVs.

In an embodiment, UI 400 can highlight the driving categories for which data is to be collected, e.g. by visually grouping the driving categories together for which data is to be collected (not shown in FIG. 4), or by visually highlighting the driving categories for which data is to be collected. As shown in FIG. 4, four categories are bolded to show that they are the driving categories 440 for which instructions have been received to collect human driving data: Left steering 0%-20%, Left steering 20%-40%, Right steering 0%-20%, and Right steering 20%-40%.

As the ADV is being driving by the human driver, an indication can be provided that lets the driver know which driving category 440 matches the current state of the ADV. In an embodiment, indicator 455 an provide a visual indication of a current driving category that the human driver is driving the ADV 101 in accordance with a particular driving category 440, in this case, "left steering 20%-40%." In an embodiment, the indication 455 can also, or alternatively, include an audio indication of the current driving category 455. In an embodiment, when the progress of data collection for a driving category 440 reaches 100%, the visual highlighting of driving category 440 may be removed so that only the driving categories 440 for which data is still to be collected (progress less than 100%) remain highlighted. In an embodiment, progress indicator 442 may in addition, or alternatively, include a visual progress bar overlaid onto the driving category 440 for which data is being collected. In an embodiment, progress indicator 442 may further include an audio message indicating progress of data collection for a driving category 440. In an embodiment, the human driver can choose the driving categories to decide where to perform the driving data collection task, such as normal driving, empty parking lot, speedway, or test track.

UI 400 can further include a data collection control 425 to turn on/off data collection for the driving categories 440 for which the human driver is to collect data. UI 400 can further include a driving mode control 430 that selects manual ("human driver") mode or self-driving (autonomous driving) mode for the ADV 101. UI 400 can also include a control to upload data 435. When selected, upload data 435 uploads the data collected for the driving categories 440 for which the ADV 101 was instructed to collect data. Upload data control 435 can include a progress indicator to let the human driver know the progress of data uploading to server 103. UI 400 can also include a reset control 445 that can reset progress indicators 442 for all driving categories 440. In an embodiment, selecting the reset control 445 can also flush persistent storage 352 storage frames of driving data 313.

The present disclosure accounts for the fact that different models or configurations of vehicles have different physical attributes, such as weight, wheel base, turning radius, braking configuration, engine horsepower, acceleration, top speed, etc. UI 400 can include an ADV model selector 450 that includes a drop down list (indicated by the down arrow "▼" in control 450 of FIG. 4) that allows the user to select the particular model of ADV for which driving data is collected. In an embodiment, the ADV model 450 defaults to the specific model of ADV 101 in which the UI 400 is installed and in-use. Selecting a specific model can automatically update the UI 400 to indicate driving categories 440 that are defined for the specific model of ADV 101, which can differ from other models of ADV 101.

UI 400 can also include a general display area 420 that can display any relevant information to the human driver. In self-driving mode, the display 420 would be used to indicate a planned trajectory of the ADV 101, obstacles along the driving path of the ADV 101, and the like. In human driving mode, this information may be considered a distraction to the human driver and may be omitted.

Figure 4B:
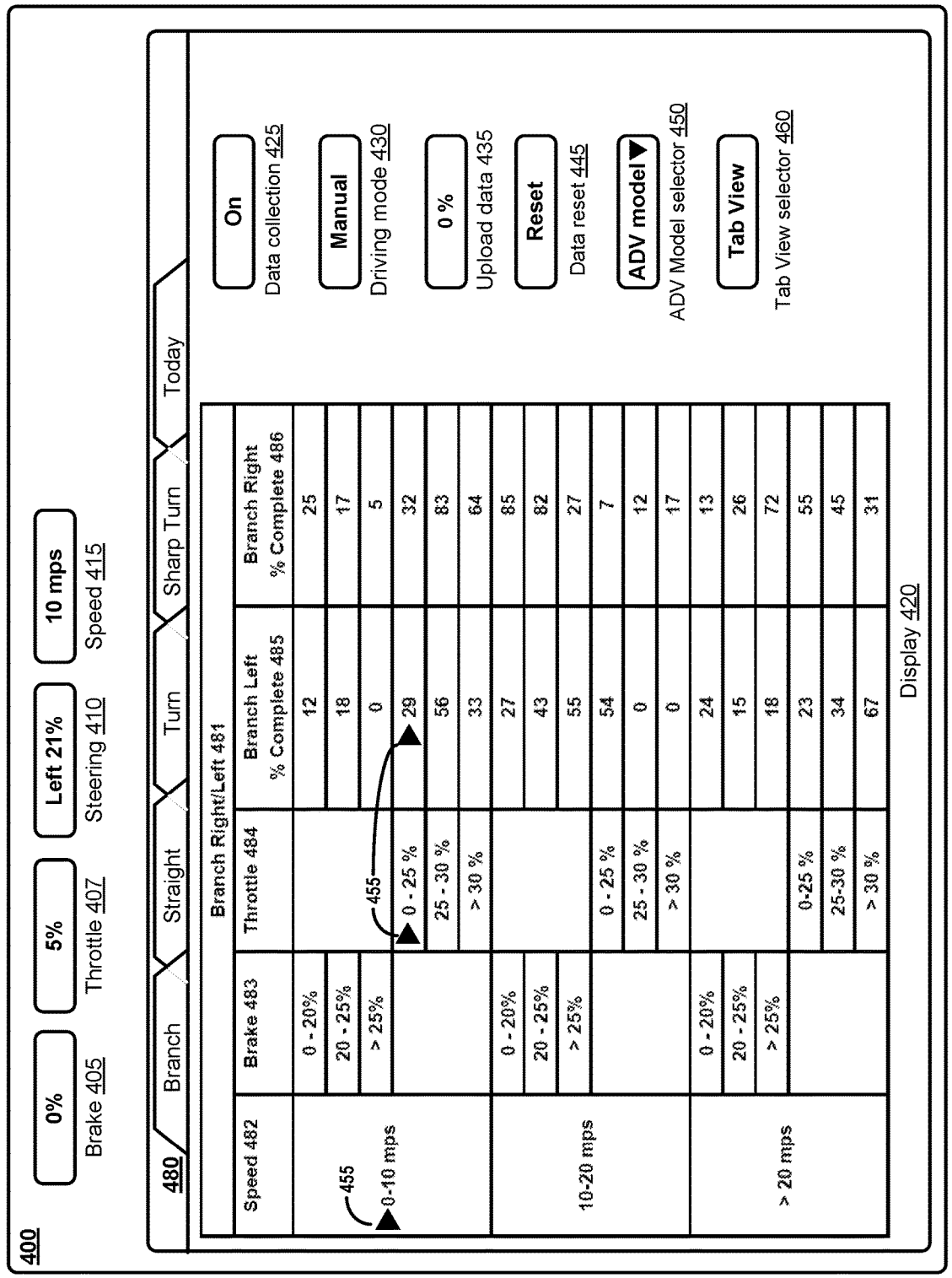

FIG. 4B is a block diagram illustrating a user interface 400 for a data collection automation system in an autonomous driving vehicle (ADV) according to an embodiment. In this user interface 400, a user has selected "Tab View" using tab view selector 460. In tab view, driving display is filled with a tabbed selection 480 of different combinations of driving categories 440 to choose from. Tabs may include driving categories for branch turn (e.g. 20°-75°, straight driving (no turn), a turn (e.g. 75°-90° turn), sharp turn (e.g. 180° U-turn, or similar sharp turn). Tabs 480 may further include a tab labeled "Today," indicating driving categories for which driving data collection instructions have been received. The Today tab can include driving categories 440 shown in FIG. 4A, or as shown tabbed view driving categories, e.g. branch, straight, turn, sharp turn, at certain speed range and brake or throttle input.

In the tabbed view shown in FIG. 4B, the branch 481 tab has been selected. Selection of a tab can be made by touching the desired tab on the display 420, voice command (e.g. "branch tab"), or other selection method. Branch tab 481 displays driving categories and progress indicators for each driving category. Each driving category may have a speed range 482, e.g. 0-10 mps, 10-20 mps, or greater than (">") 20 mps. For each speed range 482, the driving category can have either a brake 483 input range or a throttle 484 input range. Brake 483 input ranges can be, e.g., 0-20%, 20-25%, or greater than 25%. Throttle 484 input ranges can be, e.g. 0-25%, 25-30%, or greater than 30%. The range values shown are exemplary, and non-limiting. Speed 482 ranges, brake 483 input ranges, and throttle 484 input ranges can be specified and edited, added to, or deleted. For each speed range 482, and brake 483 input or throttle 484 input, there can be a driving category with progress indicator for "branch left" 485 or "branch right" 486. A branch is a turn that is, e.g. 20°-75° turning from straight ahead driving. A progress indicator can be displayed under the heading "branch left % complete 485" or "branch right % complete 486." A numeric percentage of completion of an amount of driving data to collect for the driving category is shown in FIG. 4B. Percentage completion can be shown by other indicator such as a progress bar, audio indication, or other manner of indicating progress on the data collection for the driving category.

To facilitate easy viewing for the human driver, a current driving category in which the driver is driving the vehicle can be indicated by, e.g., highlighting the speed range in which the human driver is currently driving the ADV, highlighting the applicable brake 483 or throttle 484 input range that the vehicle is being operated, or by means of a visual cue, such as arrow 455, as shown in FIG. 4. In an embodiment, as the human driver navigate the ADV, and speed 482, and brake 483 or throttle 484 inputs, and branch left 485 or right 486 progress indicator visual highlights or cues can automatically update to reflect a current state of operation of the ADV.

In the tabbed view of FIG. 4B, the same controls as shown in FIG. 4A may be located into a different part of the UI 400. For example, controls for data collection on/off 425, driving mode 430, update data 435, data reset 455, ADV model selector 450, and Tab view selector 460 can be shown arranged in a vertical column at the right of the tabbed view area of display 420.

The Straight tab can have a display layout (not shown) similar to the Branch tab 481, with a column for speed range 482, brake input range 483, and throttle input range 484. A column 485 may be shown for straight driving data collection progress within one of the driving categories, e.g. 0-10 mps with throttle input of 0-25%. A straight driving category can represent substantially straight-ahead driving within, e.g. 0 . . . ±20° turning from straight ahead.

The Turn tab can have a display layout (not shown) similar to the Branch tab, with a column for speed range 482, brake input range 483, and throttle input range 484. A column 485 may be shown for left turn driving data collection progress within one of the driving categories, e.g. a speed range 482 of 0-10 mps with throttle input 484 of 0-25%. A column 486 may be shown for right turn driving data collection progress within of the driving categories of speed range, and brake 483 or throttle 484 input range. Turn driving can represent a turn within, e.g. 20°-90° from straight ahead, either left 485 or right 486.

The Sharp Turn tab can have a display layout (not shown) similar to the Branch tab, with a column for speed range 482, brake input range 483, and throttle input range 484. A column 485 may be shown for sharp left turn driving data collection progress 485 within each of the driving categories, e.g. speed range 482 of 0-10 mps with throttle 484 input of 0-25%. A column 486 may be shown for sharp right turn driving data collection progress within each of the driving categories of speed range 482, and brake 483 or throttle 484 input range. Turn driving can represent a turn within, e.g. 20°-90° from straight ahead, either left 485 or right 486.

Figure 5:
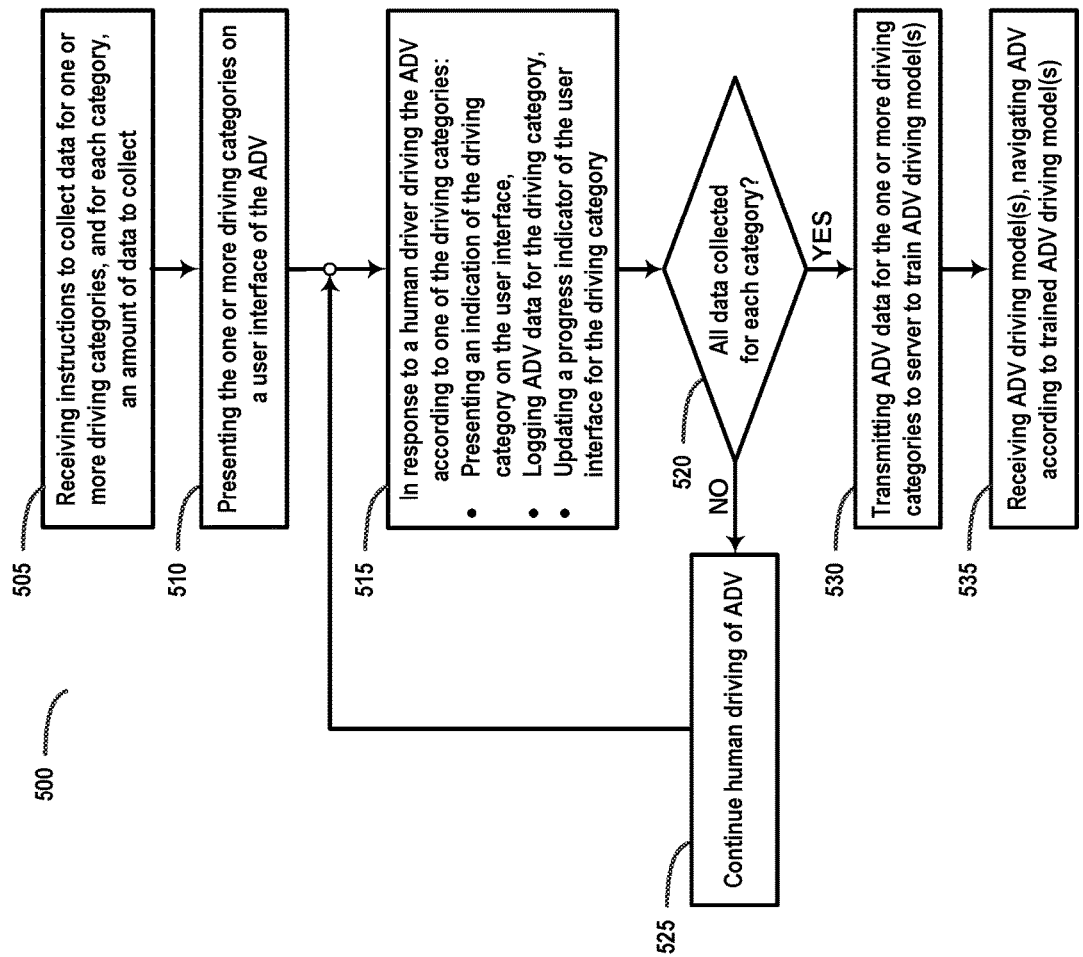
FIG. 5 is a block diagram illustrating a method of an ADV performing data collection for one or more driving categories while in human driving mode, according to an embodiment.

FIG. 5 is a block diagram illustrating a method 500 of an ADV performing data collection for one or more driving categories while in human driving mode, according to an embodiment.

In operation 505, instructions are received to collect driving data for one or more driving categories, e.g. driving categories 440. The instructions include an amount of data to collect for each driving category. As described above, the ADV can receive the instructions as to which driving categories the human driver is to collect data for by driving the ADV in accordance with the specified driving categories, and the ADV can automatically update the user interface (e.g. UI 400) to highlight the driving categories that the driving is to collect data for. In an embodiment, the human driver can receive the instructions via email in the ADV and activate a control to cause the email to highlight the driving categories for which the human driver is to collect driving data. Alternatively, as described above with reference to FIG. 4, the human driver can manually select the driving categories for which he/she is to collect data, and enter an amount of data to be collected, e.g. in seconds or frames of data.

In operation 510, the one or more driving categories for which the human driver is to collect driving data are presented on the user interface. In an embodiment, the one or more driving categories for which the driver is to collect driving data are grouped together so that the human driver may readily identify these driving categories. Alternatively, or in addition, the driving categories may be highlighted so that the driver may easily identify the driving categories for which the ADV is to be driven in accordance with the driving categories. In an embodiment, only the driving categories for which the human driver is to collect driving data are shown on the user interface.

In operation 515, in response to determining that human driving mode is active for the ADV, and that the human driver is driving the ADV in accordance with one of the driving categories for which the human driver is instructed to collect driving data: the user interface presents an indication to the human driver of the driving category that matches a current driving state of the ADV 101, logging of ADV human driving data for the driving category is performed, and a progress indicator is updated as to how much of the required amount of driving data to be collected has been collected. As described above, with reference to FIG. 3, driving data is obtained by driving monitor 308 as received messages from a plurality of sensors and modules within perception and planning system 110. Driving monitor 308 can sequence and package the messages into data frames so that data frame logger 309 can store the data frames driving data 313 in persistent storage 352. In an embodiment, data frames are packaged in sequences of approximately 10 milliseconds (ms).

In operation 520, it can be determined whether all (100%) of the specified amount of data to be collected for the driving category has been collected. If not, then method 500 continues at operation 525. Otherwise method 500 continues at operation 530. In operation 525, the human driver continues to drive the ADV. Method 500 continues at operation 515. In operation 530, all data for all driving categories that the ADV was instructed to collect has been collected and the ADV transmits the collected driving data to server 103 to train one or more ADV driving models for autonomous driving of the ADV. In operation 535, the ADV receives a trained dynamic driving model from the server, activates the received dynamic driving model, and navigates the ADV in self-driving (autonomous) driving mode.

Figure 6:
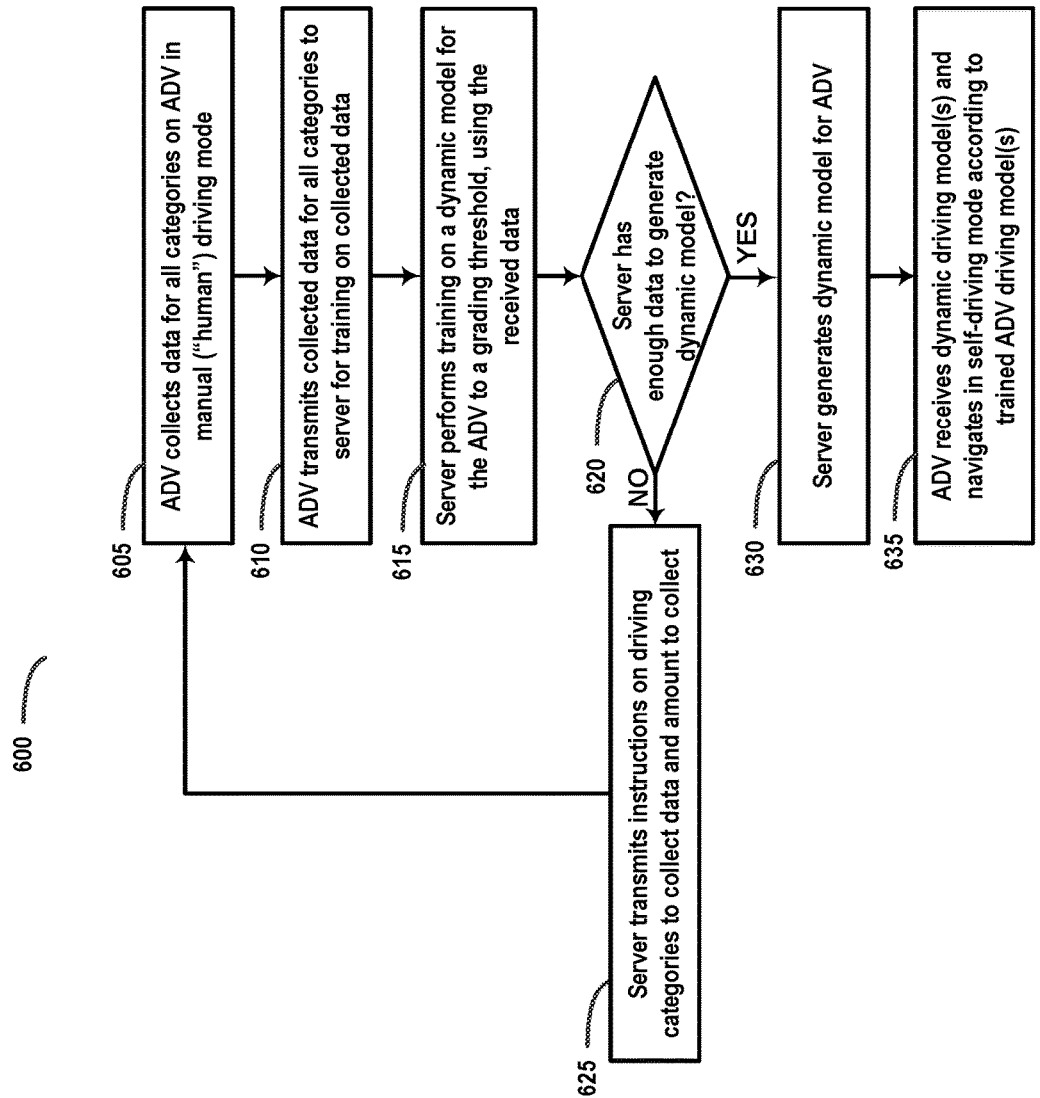
FIG. 6 is a block diagram illustrating a method of an ADV performing data collection for one or more driving categories while in human driving mode, and a server using the collected data to generate an ADV self-driving model, according to an embodiment.

FIG. 6 is a block diagram illustrating a method 600 of an ADV and server performing data collection for one or more driving categories while in human driving mode, according to an embodiment. In the embodiment of FIG. 6, one or more ADVs collect data for all driving categories for a predefined or default amount of data. The server receives driving data for all driving categories from the plurality of ADVs. Server attempts to correlate the received data with a set of variables defined for a dynamic self-driving model for the ADV. If the server determines that it does not have enough data to achieve a threshold grading value of collected data to variables of the self-driving model, e.g. 65% or greater, then the server instructs one or more ADVs as to specific driving categories upon which to collect additional driving data and an amount of additional driving data to collect for each driving category. The process repeats until the server determines that threshold grading of data to variables is greater than a threshold amount, then the server generates a dynamic model for navigating the ADV in self-driving mode.

In operation 605, one or more ADVs collect a default or predefined amount of driving data for each of all driving categories 440 on the ADV 101 in human driving mode. In operation 610, the one or more ADVs each transmit their collected driving data for each of the driving categories to the server. In operation 615, the server performs training, described below with reference to FIG. 7, on a dynamic model for the ADV to a grading threshold, using the collected data received from the plurality of ADVs. In operation 620, it is determined whether the server has enough driving data to achieve a threshold grading value for a dynamic self-driving model for driving the ADV in self-driving mode to greater than minimum threshold grading value, e.g. 65%. If not, then method 600 continues at operation 625, otherwise method 600 continues at operation 630.

In operation 625, the server transmits an instruction to one or more ADVs to collect a specified amount of additional driving data for each of a specified list of driving categories. Method 600 continues at operation 605. In operation 630, it has been determined that the server has enough data to achieve a machine learning grade of greater than a threshold amount, e.g. 65%, of the received driving data to variables of a dynamic model for navigating an ADV in self-driving mode. The server generates the dynamic model for navigating the ADV in self-driving mode. In operation 635, an ADV in the one or more ADVs receives the dynamic model from the server and navigates the ADV using the dynamic model.

Figure 7:
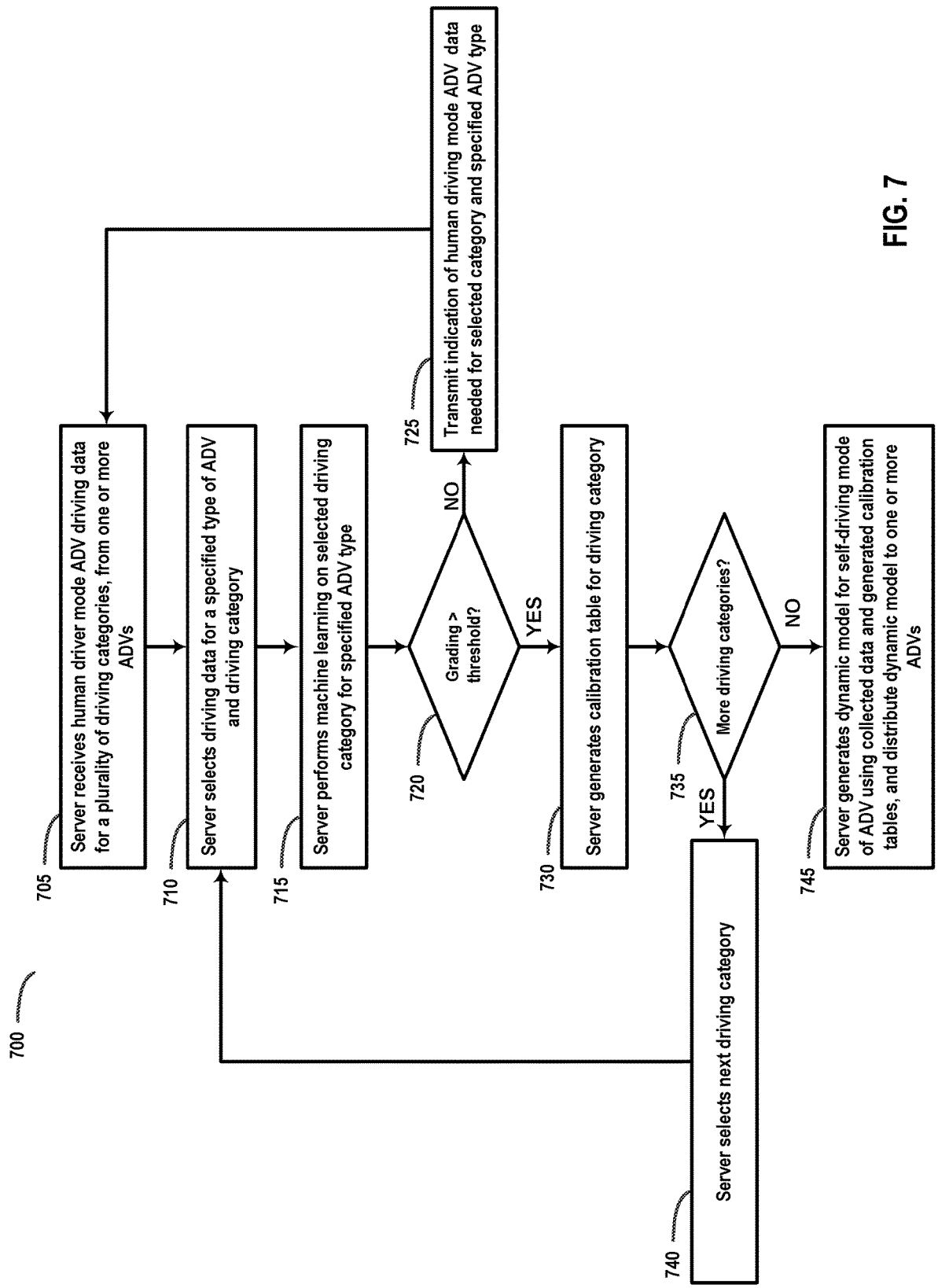
FIG. 7 is a block diagram of a method of a server training a dynamic model for one or more ADVs using data collection automation, in an embodiment.

FIG. 7 is a block diagram of a method 700 of a server training a dynamic model using data collection automation, the dynamic model for use by one or more ADVs in navigating in self-driving mode. In operation 705, server receives human mode driving data for a plurality of driving categories 440 from one or more ADVs. In operation 710, server selects driving data for a specified type of ADV and for at least one driving category. In operation 715, server performs machine learning on the selected driving category for the specified type of ADV. In operation 720, it can be determined whether the machine learning resulted in a machine learning grading value greater than a predetermined threshold value, e.g. 65%, between the selected data and variables of a model or calibration table for the ADV for the selected driving category. If the grading value is greater than a threshold amount, then method 700 continues at operation 730, otherwise method 700 continues at operation 725.

In operation 725, server transmits a message to one or more ADVs of the specified type indicating that additional driving data is needed for this driving category, including an estimated amount of driving to collect for the driving category, for the specified model of ADV. In an embodiment, the message can be transmitted to a test engineer for use in building data collection plan for the specified model of ADV. In an embodiment, the message is transmitted to an ADV as instructions to collect the specified amount of driving data for the driving category. In an embodiment, the message is transmitted to a human driver of the ADV, as data collection instructions to manually enter into the ADV, or as an email containing an activation control that, when activated, updates a user interface of the ADV to indicate the driving data to be collected.

In operation 730, the server generates a calibration table or model for the selected driving category using the received and selected driving data for the specified type of ADV. In operation 735, it can be determined whether there are more driving categories for the specified type of ADV upon which the server should perform training. If so, then method 700 continues at operation 740, otherwise method 700 continues at operation 745. In operation 740, the server selects a next driving category upon which to perform training using the received human driver driving data. Method 700 continues at operation 710. In operation 745, the server generates a dynamic model for use in self-driving mode of the specified type of ADV using the collected data and generated calibration tables and models. The server distributes the dynamic model to one or more ADVs of the specified type for use in navigating the ADVs.

Figure 8:
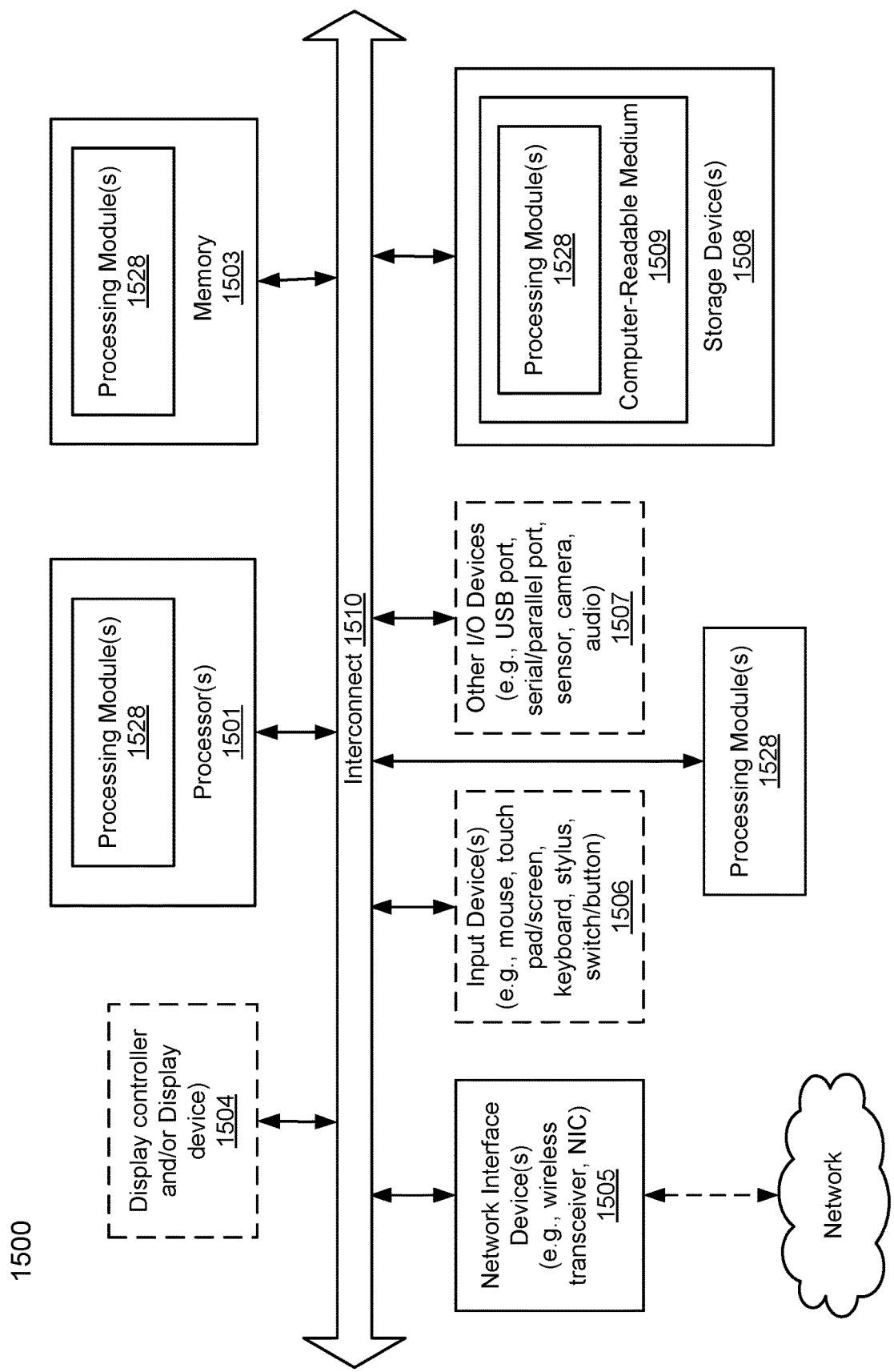
FIG. 8 is a block diagram illustrating a data processing system according to one embodiment.

FIG. 8 is a block diagram illustrating an example of a data processing system which may be used with one embodiment of the disclosure. In an embodiment, a data collection server as described above may be implemented in a multi-computer group, in a cluster, in a cloud computing environment, or other distributed or networked system. ADVs having a computing system as described with respect to FIG. 8, can be nodes in the multi-computer group, cluster, could, or other distributed or networked system. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, routing module 307, driving monitor 308, and data frame logger 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method performed on a computing system of an autonomous driving vehicle (ADV), the method comprising:
presenting one or more driving categories on a user interface of the ADV, wherein each of the one or more driving categories is selectable for collecting driving data of the driving category;
receiving a selection of a selected driving category of the one or more driving categories via the user interface, and in response to the selection of the selected driving category of the one or more driving categories received via the user interface:
presenting, via the user interface, an indication of the selected driving category in which the ADV is being driven,
collecting driving data associated with the selected driving category, the driving data including control commands issued and states of the ADV in response to the control commands captured at different points in time, and
displaying and updating a progress indicator on the user interface that indicates progress on an amount of data collected for the selected driving category, while the driving data is being collected; and
storing the collected driving data for the selected driving category of the one or more driving categories in a persistent storage device of the computing system, wherein the collected driving data is transmitted to a server to train a driving model for the ADV for subsequent autonomous driving.

2. The method of claim 1, wherein collecting driving data for one or more driving categories of driving is further performed in response to a request received from a server over a network.

3. The method of claim 1, wherein an amount of data to be collected is specified as a number of seconds of data frames, or a number of data frames via the user interface.

4. The method of claim 1, wherein the driving categories are predefined.

5. The method of claim 1, wherein the progress indicator comprises one or both of a graphical indicator of the selected driving category on the user interface or an audio indicator of the selected driving category.

6. The method of claim 1, wherein the collected driving data for the selected driving category includes a label identifying the selected driving category, and at least a speed of the ADV, an amount and direction of a steering input to a steering control of the ADV, and an amount of a brake input to a braking control of the ADV.

7. The method of claim 1, wherein the progress indicator indicates a data collection progress on the selected driving category made by this ADV, or an indication of a data collection progress on the selected driving category by a plurality of ADVs received from the server.

8. A non-transitory machine-readable medium having instructions stored therein, which when executed by a processor, cause the processor to perform operations, the operations comprising:
  presenting one or more driving categories on a user interface of an autonomous driving vehicle (ADV), wherein each of the one or more driving categories is selectable for collecting driving data of the driving category;
  receiving a selection of at least one selected driving category of the one or more driving categories via the user interface, and in response to the selection of the at least one selected driving category of the one or more driving categories received via the user interface:
    presenting, via the user interface, an indication of the at least one selected driving category in which the ADV is being driven,
    collecting driving data associated with the at least one selected driving category, the driving data including control commands issued and states of the ADV in response to the control commands captured at different points in time, and
    displaying and updating a progress indicator on the user interface that indicates progress on an amount of data collected for the at least one selected driving category, while the driving data is being collected; and
  storing the collected driving data for the at least one selected driving category of the one or more driving categories in a persistent storage device of a computing system, wherein the collected driving data is transmitted to a server to train a driving model for the ADV for subsequent autonomous driving.

9. The machine-readable medium of claim 8, wherein collecting driving data for one or more driving categories of driving is further performed in response to a request received from a server over a network.

10. The machine-readable medium of claim 8, wherein an amount of data to be collected is specified as a number of seconds of data frames, or a number of data frames via the user interface.

11. The machine-readable medium of claim 8, wherein the driving categories are predefined.

12. The machine-readable medium of claim 8, wherein the progress indicator comprises one or both of a graphical indicator of the at least one selected driving category on the user interface or an audio indicator of the at least one selected driving category.

13. The machine-readable medium of claim 8, wherein the collected driving data for the at least one selected driving category includes a label identifying the at least one selected driving category, and at least a speed of the ADV, an amount and direction of a steering input to a steering control of the ADV, and an amount of a brake input to a braking control of the ADV.

14. The machine-readable medium of claim 8, wherein the progress indicator indicates a data collection progress on the at least one selected driving category made by this ADV, or an indication of a data collection progress on the at least one selected driving category by a plurality of ADVs received from the server.

15. A data processing system, comprising:
  a processor; and
  a memory coupled to the processor to store instructions, which when executed by the processor, cause the processor to perform operations, the operations including:
    presenting one or more driving categories on a user interface of an autonomous driving vehicle (ADV), wherein each of the driving categories is selectable for collecting driving data of the driving category;
    receiving a selection of a selected driving category of the one or more driving categories via the user interface, and in response to the selection of the selected driving category of the one or more driving categories received via the user interface:
      presenting, via the user interface, an indication of the selected driving category in which the ADV is being driven,
      collecting driving data associated with the selected driving category, the driving data including control commands issued and states of the ADV in response to the control commands captured at different points in time, and
      displaying and updating a progress indicator on the user interface that indicates progress on an amount of data collected for the selected driving category, while the driving data is being collected; and
    storing the collected driving data for the one or more driving categories in a persistent storage device of the data processing system, wherein the collected driving data is transmitted to a server to train a driving model for the ADV for subsequent autonomous driving.

16. The system of claim 15, wherein collect driving data for one or more driving categories of driving is performed in response to a request received from a server over a network.

17. The system of claim 15, wherein an amount of data to be collected is specified as a number of seconds of data frames, or a number of data frames via the user interface.

18. The system of claim 15, wherein the driving categories are predefined.

19. The system of claim 15, wherein the progress indicator comprises one or both of a graphical indicator of the selected driving category on the user interface or an audio indicator of the selected driving category.

20. The system of claim 15, wherein the collected driving data for the selected driving category includes a label identifying the selected driving category, and at least a speed of the ADV, an amount and direction of a steering input to a steering control of the ADV, and an amount of a brake input to a braking control of the ADV.

21. The system of claim 15, wherein the progress indicator indicates a data collection progress on the selected driving category made by this ADV, or an indication of a data collection progress on the selected driving category by a plurality of ADVs received from the server.

* * * * *